United States Patent
Tsongas et al.

(10) Patent No.: US 8,839,230 B2
(45) Date of Patent: Sep. 16, 2014

(54) METHOD AND APPARATUS FOR AUTOMATICALLY DISTRIBUTING FIRMWARE UPDATES IN AN IMAGE PRODUCTION DEVICE NETWORK

(75) Inventors: Jason C. Tsongas, Rochester, NY (US); Matthew O. Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 379 days.

(21) Appl. No.: 13/310,100

(22) Filed: Dec. 2, 2011

(65) Prior Publication Data

US 2013/0145358 A1 Jun. 6, 2013

(51) Int. Cl.
*G06F 9/44* (2006.01)
*G06F 9/445* (2006.01)
*H04L 29/08* (2006.01)

(52) U.S. Cl.
CPC ............ *G06F 8/65* (2013.01); *H04L 29/08981* (2013.01)
USPC ........................................................ 717/173

(58) Field of Classification Search
USPC .......................................... 717/168, 171–173
See application file for complete search history.

(56) References Cited

U.S. PATENT DOCUMENTS

| | | | |
|---|---|---|---|
| 8,149,844 B1 * | 4/2012 | Roskind et al. | 370/395.21 |
| 2005/0149923 A1 * | 7/2005 | Lee | 717/172 |
| 2007/0245333 A1 * | 10/2007 | Ferlitsch | 717/168 |

* cited by examiner

*Primary Examiner* — Anna Deng
(74) *Attorney, Agent, or Firm* — Ronald E. Prass, Jr.; PRASS LLP

(57) ABSTRACT

A method for automatically distributing firmware updates in an image production device network is disclosed. The method may include receiving a firmware update from a firmware distribution source through a communication interface, automatically installing the firmware update, automatically distributing the firmware update to one or more other image production devices in the image production device network through the communication interface. The firmware update may then be automatically installed by the one or more other image production devices in the image production device network.

15 Claims, 4 Drawing Sheets

METHOD AND APPARATUS FOR AUTOMATICALLY DISTRIBUTING FIRMWARE UPDATES IN AN IMAGE PRODUCTION DEVICE NETWORK

BACKGROUND

Disclosed herein is a method for automatically distributing firmware updates in an image production device network, as well as corresponding apparatus and computer-readable medium.

In conventional image production device networks, when to perform a firmware update, the customer has the choice of downloading the firmware file and pushing that file to the device being upgrade, or some devices may offer an automated process of pulling device firmware and installing in the device. The manual method requires periodic human intervention and can be very time consuming for a fleet of image production devices. The automatic method requires each device to have an "outside" connection to the internet to enable this functionality which creates a serious security risk for the customer. The automatic method also increases the bandwidth usage of a company dramatically as each device of the same type is pulling the same firmware file again and again. For example, 100 machines with a 100 MB upgrade file will use 10 GB of bandwidth to perform the upgrade.

SUMMARY

A method and apparatus for automatically distributing firmware updates is disclosed. The method may include receiving a firmware update from a firmware distribution source through a communication interface, automatically installing the firmware update, automatically distributing the firmware update to one or more other image production devices in the image production device network through the communication interface. The firmware update may then be automatically installed by the one or more other image production devices in the image production device network.

DETAILED DESCRIPTION

Figure 1:
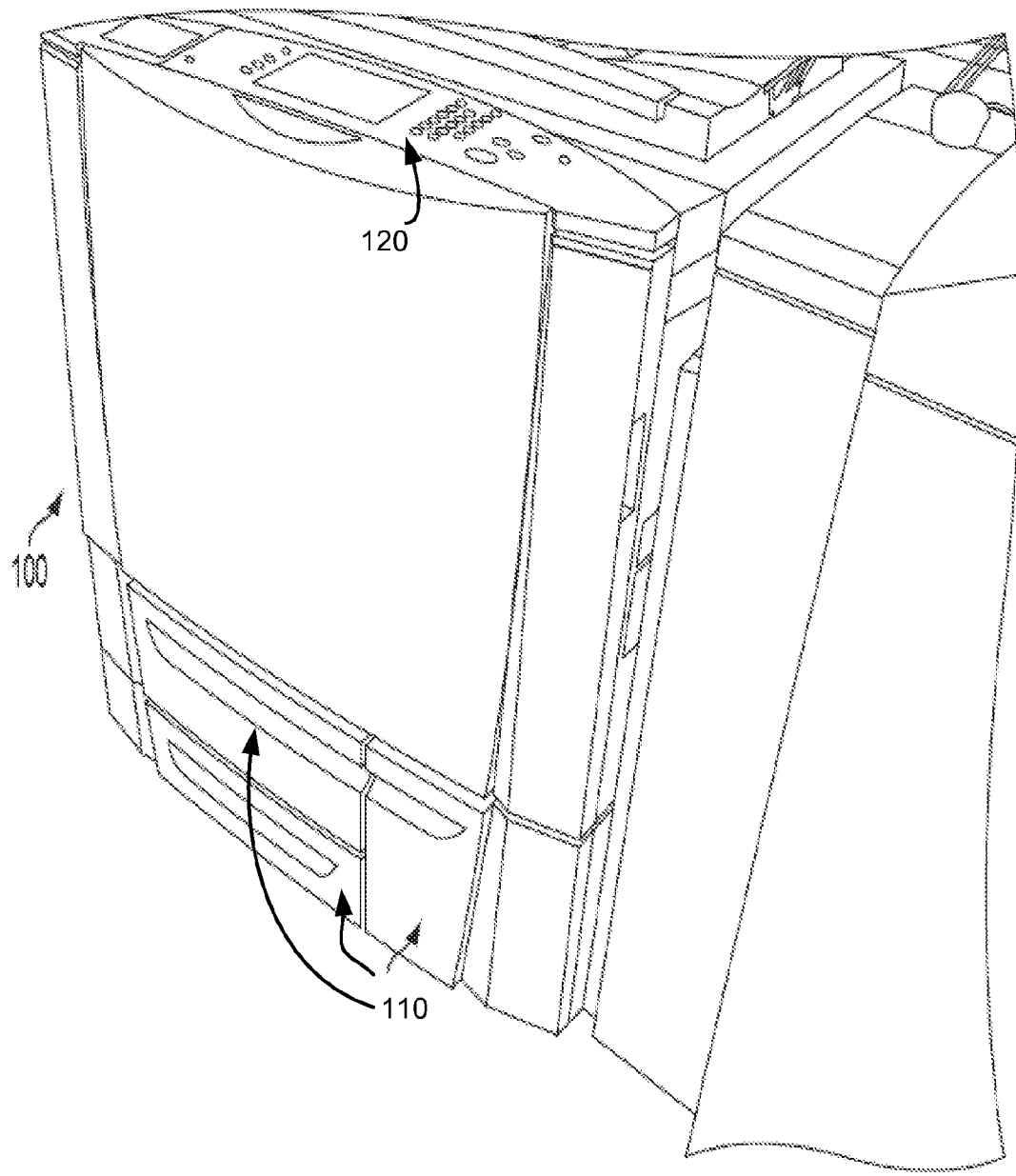
FIG. 1 is an exemplary diagram of an image production device in accordance with one possible embodiment of the disclosure.

Aspects of the embodiments disclosed herein relate to a method for automatically distributing firmware updates in an image production device network, as well as corresponding apparatus and computer-readable medium.

The disclosed embodiments may include a method for automatically distributing firmware updates in an image production device network. The method may include receiving a firmware update from a firmware distribution source through a communication interface, automatically installing the firmware update, automatically distributing the firmware update to one or more other image production devices in the image production device network through the communication interface. The firmware update may then be automatically installed by the one or more other image production devices in the image production device network.

The disclosed embodiments may further include a host image production device in an image production device network that may include a communication interface, and a firmware update management unit that receives a firmware update from a firmware distribution source using the communication interface, automatically installs the firmware update, and automatically distributes the firmware update to one or more other image production devices in the image production device network using the communication interface. The firmware update may then be automatically installed by the one or more other image production devices in the image production device network.

The disclosed embodiments may include a non-transient computer-readable medium storing instructions for controlling a computing device for automatically distributing firmware updates in an image production device network. The instructions may include receiving a firmware update from a firmware distribution source through a communication interface, automatically installing the firmware update, automatically distributing the firmware update to one or more other image production devices in the image production device network through the communication interface. The firmware update may then be automatically installed by the one or more other image production devices in the image production device network.

The disclosed embodiments may concern automatically distributing firmware updates in an image production device network. In particular, the disclosed embodiments may provide for a capability to be added to image production devices which may allow them to distribute firmware files amongst themselves without any internal server intervention. Only one device may need to be granted "outside" access and then would be able to provide firmware to all other "internal" devices. This may only require transfer of the file externally once. In the bandwidth example stated in the problem statement, the usage would go from 10 GB to as little as 100 MB.

The invention may allow for a device upgrade/change which would allow any one device to act as a host for firmware files. This host may then work in one of a few different predefined modes.

Method 1—One device with an outside connection—host configuration
  a. The host, on a predefined interval, may check the internet for a new firmware upgrade file from a predefined set of accepted locations.
  b. The host may, once it finds a suitable upgrade file, broadcast the fact it now has an upgrade file available.
  c. Machines which can use this firmware file may download the firmware/install/reboot.
    i. Each machine may determine the most appropriate time for downloading and installing firmware. Historic activity patterns at different times of day may be used to determine the most opportune time.
  d. Once the recipient machine has received a file and performed the upgrade, it too may become a host and make that file available to other machines on the network.

Method 2—No devices with an outside connection—host configuration
  e. A single machine on the network may be designated the host and a firmware file(s) may be provided to the machine.

f. The host may broadcast the fact it now has an upgrade file available.
g. Machines which can use this firmware file may download the firmware/install/reboot.
  i. Each machine may determine the most appropriate time for downloading and installing firmware. Historic activity patterns at different times of day may be used to determine the most opportune time.
h. Once the recipient machine has received a file and performed the upgrade, it too may become a host and make that file available to other machines on the network.

Method 3—No device with an outside connection—super host configuration i. A single machine on the network may be designated a "super host" and all (or most) relevant firmware file(s) may be provided to the machine. These firmware files may be both for the host machine as well as for other suitable models on the network.
  j. The "super host" may broadcast the fact it now has upgrade files available.
  k. Machines which can use this firmware file may download the firmware/install/reboot.
    i. Each machine may determine the most appropriate time for downloading and installing firmware. Historic activity patterns at different times of day may be used to determine the most opportune time.
  l. Once the recipient machine has received a file and performed the upgrade, it may become a host only and only make its compatible firmware available to other like machines on the network.

This "viral" method of firmware distribution may allow for devices which are not externally connected to receive a new firmware file and perform an upgrade. Also, by the nature of being viral, with each subsequent firmware installation there may be a growing number of machines available to host the new firmware file. The number of hosts would grow exponentially allowing for a much fast distribution of a new firmware file. Further, the devices would be able to choose host machines which are closer so as to minimize the traffic impact.

Currently, the methods used only allow for one management server to upgrade one machine at a time. This process is very slow and often results in multiday upgrade for a medium or larger organization Example With the current method, with an upgrade which requires 10 minutes per device will result in a total of six (6) upgraded machines in one hour.

With this new method, with an upgrade which requires 10 minutes per device will result in a total of sixty four (64) upgrade machines in one hour.

With the initial enablement of this feature within an account, the account may have options such as: frequency of checking for new firmware, accepted domains to check, accepted times of day to perform upgrades, etc.

Benefits:
Alleviates the need to manually upgrade firmware for devices on the network using a one-by-one approach.
Customer satisfaction through a greatly increased upgrade speed with no manual intervention.
Financial benefit to Xerox through the faster and less manual approach for managed service accounts.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media trays 110 and a local user interface 120. The one or more media trays 110 may each contain media of a particular media sheet size. The one or more media trays 110 may be opened by a user so that media may be checked, replaced, or to investigate a media misfeed or jam, for example.

The user interface 120 may contain one or more display screens (which may be a touchscreen or simply a display), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network.

Figure 2:
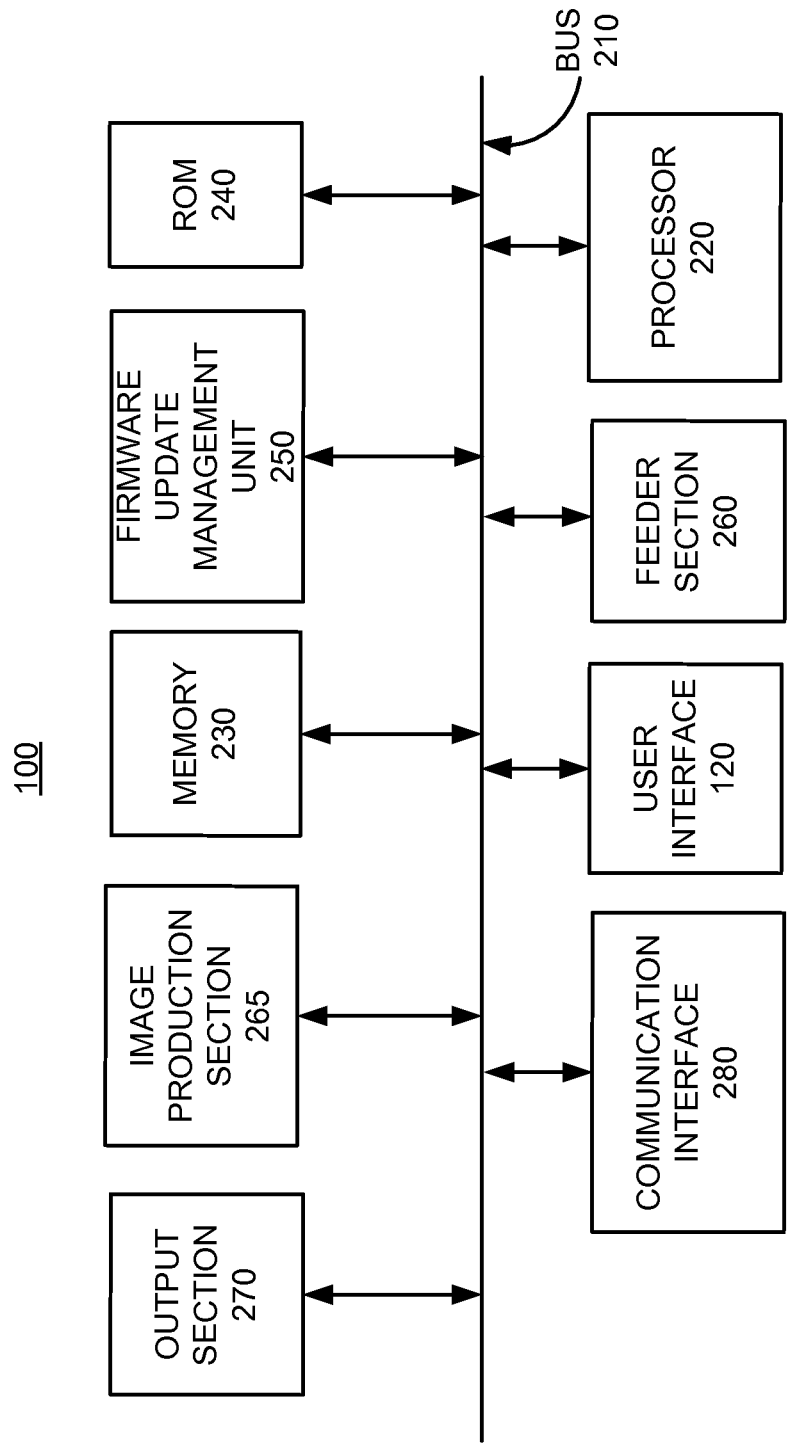
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a firmware management unit 250, a feeder section 260, an output section 270, a user interface 120, a communication interface 280, and an image production section 265. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

The image production section 265 may include hardware to produce image on media and may include an image printing and/or copying section, a scanner, a fuser, etc., for example. The feeder section 260 may be stand-alone or integrated and may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed. The one or more media trays 110 may be accessed by a user by opening the one or more media tray doors.

User interface 120 may include one or more conventional mechanisms that permit a user to input information to and interact with the image production unit 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

Figure 3:
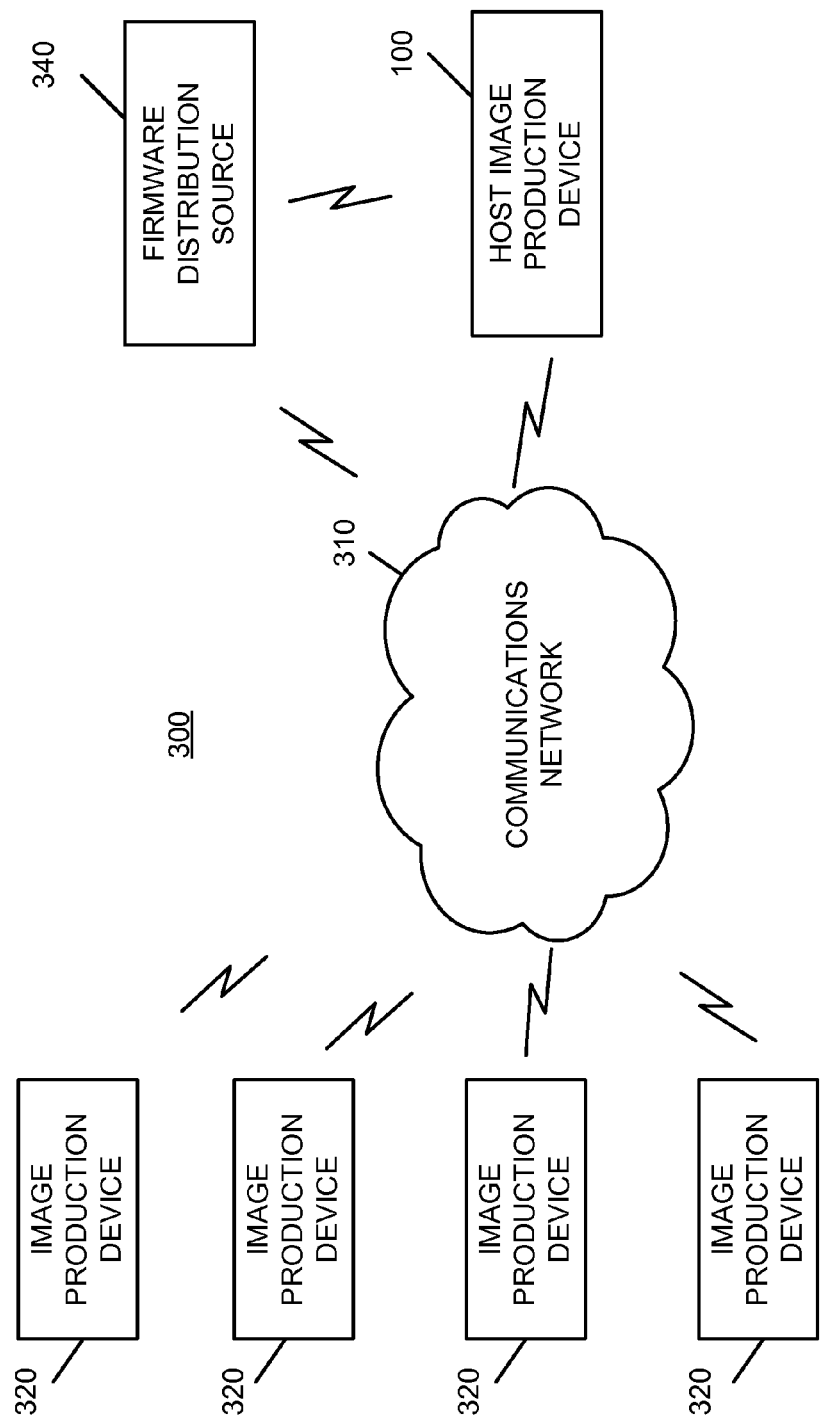
FIG. 3 is an exemplary diagram of an image production device network in accordance with one possible embodiment of the disclosure.

FIG. 3 is an exemplary diagram of an image production device network 300 in accordance with one possible embodiment of the disclosure. The image production device network environment 300 may include one or more image production devices 320, a host image production device 100, and a firmware distribution source 340 connected through the communications network 310. The image production device management unit 320 may be a server, computer, handheld computer or processing device, for example. The image production devices 320 and the host image production device 100 may be a copier, a printer, a facsimile device, or a multi-function device (any combination of copier, facsimile, scanner and printer devices), for example.

The host image production device 100 may communicate with image production devices 320 and the firmware distribution source 340 via the communication interface 280 over the communications network 310 for example. The host image production device 100 may also communicate with image production devices 320 and the firmware distribution source 340 directly via the communication interface 280, for example. In an embodiment of the present disclosure, the host image production device 100 may be manufacturer owned, distributor owned, third party owned, and customer owned, for example.

The host image production device 100 may receive firmware updates from the firmware distribution source 340, automatically install the updates, and then automatically distribute the updates to other image production devices 320 in the image production device network 300 so that those devices may automatically install the update, for example. The host image production device 100 may also be configured to automatically install the update at the same time as it is distributing the updates to other image production devices 320 in the image production device network 300, for example.

The host image production device 100 may also be configured to store the type or model number of devices 320 and location (or addresses) of the devices 320 in the network and only distribute the updates to other image production devices 320 in the image production device network that match the model/type of the firmware update, for example. The host image production device 100 may also receive firmware updates from the firmware distribution source 340 that are not of the model/type of the host image production device so that the update is automatically distributed by and not installed in, the host image production device 100, for example.

After the firmware update is installed by the one or more other image production devices 320, the firmware update may then be automatically distributed to another set of image production devices 320 in the image production device network for installation.

The operation of the automatic firmware update management unit 250 and the automatic firmware update distribution process will be discussed below in relation to the flowchart in FIG. 4.

Figure 4:
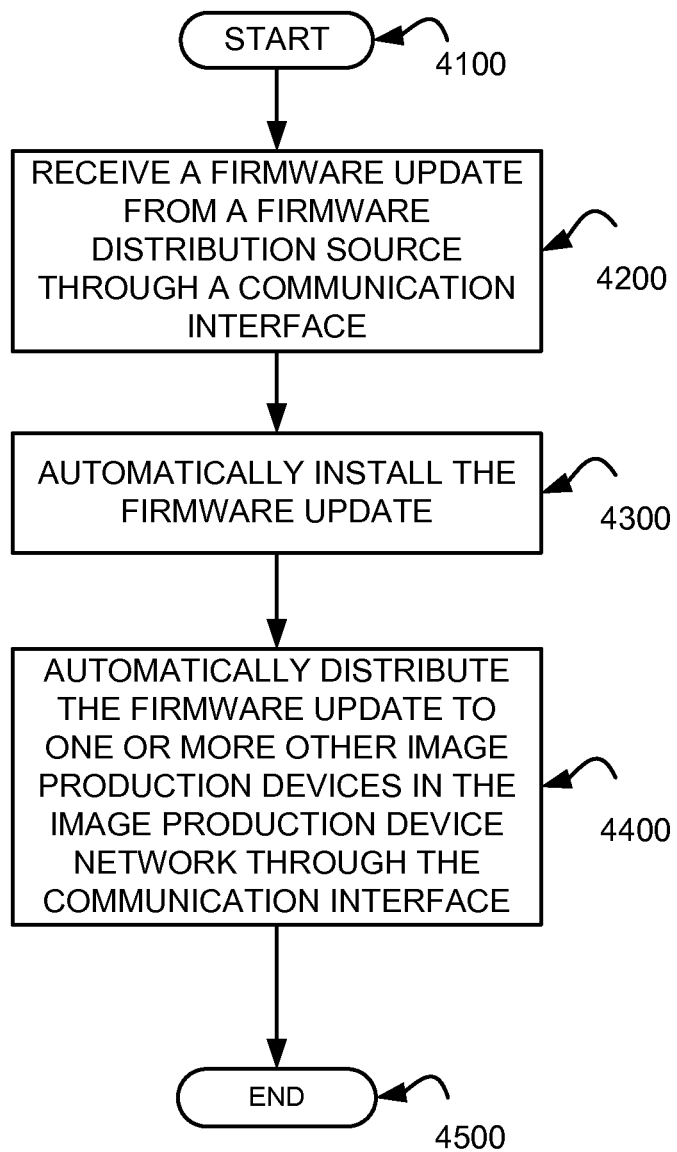
FIG. 4 is a flowchart of an exemplary automatic firmware distribution process in accordance with one possible embodiment of the disclosure.

FIG. 4 is a flowchart of an automatic firmware distribution process in accordance with one possible embodiment of the disclosure. The process may begin at step 4100 and may continue to step 4200 where the firmware update management unit 250 may receive a firmware update from a firmware distribution source 340 through the communication interface 280. In this manner, the firmware update management unit 250 may periodically check for firmware updates from the firmware distribution source 340. The firmware update management unit 250 may also broadcasting a message to the one or more image production devices 320 that the host image production device 100 is the host for the image production device network 300.

At step 4300, the firmware update management unit 250 may automatically install the firmware update. At step 4400, the firmware update management unit 250 may automatically distribute the firmware update to one or more other image production devices 320 in the image production device network through the communication interface 280. The firmware update may then be automatically installed by the one or more other image production devices 320 in the image production device network 300. The process may then go to step 4500 and end.

The firmware update management unit 250 may identify the one or more image production device models for which the firmware update is intended and distribute the firmware update only to the one or more identified image production devices models in the image production device network 300, for example. After the firmware update is installed by the one or more other image production devices 320, the firmware update may then automatically distributed to another set of image production devices in the image production device network 300.

The firmware update management unit 250 may receive a notification that one or more of the one or more other image production devices 320 are host image production devices 100. The firmware update management unit 250 may then notify the one or more of the one or more other image production devices 320 that they are host image production devices 100.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically distributing firmware updates in an image production device network by a host image production device, comprising:
broadcasting a message to one or more image production devices that the host image production device is the host for the image production device network;
receiving at the host image production device a firmware update from a firmware distribution source through a communication interface;
automatically installing the firmware update at the host image production device and then the host image production device automatically distributing the firmware update to the one or more other image production devices in the image production device network through the communication interface;
automatically installing the firmware update at the one or more other image production devices in the image production device network by the one or more other image production devices in the image production device network;
periodically checking for, by the host image production device, firmware updates from the firmware distribution source.

2. The method of claim 1, further comprising:
identifying one or more image production device models for which the firmware update is intended;
wherein the firmware update is only distributed to the one or more identified image production devices models in the image production device network.

3. The method of claim 1, wherein after the firmware update is installed by the one or more other image production devices, the firmware update is distributed to another set of image production devices in the image production device network.

4. The method of claim 1, further comprising:
receiving a notification that one or more of the one or more other image production devices are host image production devices;
notifying the one or more of the one or more other image production devices that they are host image production devices.

5. The method of claim 1, wherein the host image production device is one of a copier, a printer, a facsimile device, and a multi-function device.

6. A host image production device in an image production device network, the host image production device comprising:
a communication interface; and
a firmware update management unit that
broadcasts a message to one or more image production devices that the host image production device is the host for the image production device network,
receives a firmware update from a firmware distribution source using the communication interface,
automatically installs the firmware update,
automatically distributes the firmware update to the one or more other image production devices in the image production device network using the communication interface, wherein the firmware update is automatically installed at the one or more other image production devices in the image production device network by the one or more other image production devices in the image production device network, and
periodically checking for firmware updates from the firmware distribution source.

7. The host image production device of claim 6, wherein the firmware update management unit identifies one or more image production device models for which the firmware update is intended and the firmware update is only distributed to the one or more identified image production devices models in the image production device network.

8. The host image production device of claim 6, wherein after the firmware update is installed by the one or more other image production devices, the firmware update management unit distributes the firmware update to another set of image production devices in the image production device network.

9. The host image production device of claim 6, wherein the firmware update management unit receives a notification that one or more of the one or more other image production devices are host image production devices and notifies the one or more of the one or more other image production devices that they are host image production devices.

10. The host image production device of claim 6, wherein the host image production device is one of a copier, a printer, a facsimile device, and a multi-function device.

11. A non-transient computer-readable medium storing instructions for controlling a computing device for automatically distributing firmware updates in an image production device network by a host image production device, the instructions comprising:

broadcasting a message to one or more image production devices that the host image production device is the host for the image production device network;

receiving at the host image production device a firmware update from a firmware distribution source through a communication interface;

automatically installing the firmware update at the host image production device;

automatically distributing by the host image production device the firmware update to the one or more other image production devices in the image production device network through the communication interface;

automatically installing the firmware update at the one or more other image devices in the image device network by the one or more other image production devices in the image production device network; and periodically checking for, by the host image production device, firmware updates from the firmware distribution source.

12. The non-transient computer-readable medium of claim 11, further comprising:

identifying the one or more image production device models for which the firmware update is intended;

wherein the firmware update is only distributed to the one or more identified image production devices models in the image production device network.

13. The non-transient computer-readable medium of claim 11, wherein after the firmware update is installed by the one or more other image production devices, the firmware update is distributed to another set of image production devices in the image production device network.

14. The non-transient computer-readable medium of claim 11, further comprising:

receiving a notification that one or more of the one or more other image production devices are host image production devices;

notifying the one or more of the one or more other image production devices that they are host image production devices.

15. The non-transient computer-readable medium of claim 11, wherein the host image production device is one of a copier, a printer, a facsimile device, and a multi-function device.

* * * * *